US010156980B2

(12) United States Patent
Lehrian et al.

(10) Patent No.: US 10,156,980 B2
(45) Date of Patent: *Dec. 18, 2018

(54) TOGGLE GESTURE DURING DRAG GESTURE

(71) Applicant: Apple Inc., Cupertino, CA (US)

(72) Inventors: Matthew Lehrian, Bellevue, WA (US); Zachariah N. Paine, Pittsburgh, PA (US); Edward P. A. Hogan, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 14/979,311

(22) Filed: Dec. 22, 2015

(65) Prior Publication Data
US 2016/0139799 A1    May 19, 2016

Related U.S. Application Data

(63) Continuation of application No. 13/591,006, filed on Aug. 21, 2012, now Pat. No. 9,250,783.

(51) Int. Cl.
*G06F 3/0488* (2013.01)
*G06F 3/041* (2006.01)
(Continued)

(52) U.S. Cl.
CPC .......... *G06F 3/04883* (2013.01); *G06F 3/041* (2013.01); *G06F 3/0486* (2013.01);
(Continued)

(58) Field of Classification Search
CPC ... G06F 3/04883; G06F 3/041; G06F 3/04886
See application file for complete search history.

(56) References Cited

U.S. PATENT DOCUMENTS 5,483,261 A    1/1996  Yasutake
5,488,204 A    1/1996  Mead et al.
(Continued)

FOREIGN PATENT DOCUMENTS

JP    2000-163031 A    6/2000
JP    2002-342033 A    11/2002

OTHER PUBLICATIONS

Final Office Action dated Feb. 12, 2015, for U.S. Appl. No. 13/591,006, filed Aug. 21, 2012, 14 pages.
(Continued)

*Primary Examiner* — William Bashore
*Assistant Examiner* — Nathan Shrewsbury
(74) *Attorney, Agent, or Firm* — Morrison & Foerster LLP

(57) ABSTRACT

Methods and systems for providing input to a computing device based on a toggle gesture performed during a drag gesture are provided. A drag gesture can be performed on a touch screen to manipulate a user interface object. For example, the drag gesture can move the user interface object or resize the user interface object. Such manipulation commands may have alternate modes or options. For example, a user may want to place a copy of the user interface object rather than simply moving it. Accordingly, a toggle gesture can be performed during the drag gesture to choose an alternate manipulation command. For example, a drag gesture can be performed to move an object, and a toggle gesture can be performed during the drag gesture to copy the object instead of moving it.

20 Claims, 11 Drawing Sheets

(51) Int. Cl.
*G06F 3/0486* (2013.01)
*G06F 3/0484* (2013.01)

(52) U.S. Cl.
CPC ...... *G06F 3/04842* (2013.01); *G06F 3/04845* (2013.01); *G06F 3/04847* (2013.01); *G06F 3/04886* (2013.01); *G06F 2203/04808* (2013.01)

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,570,557 | B1 | 5/2003 | Westerman |
| 6,690,387 | B2 | 2/2004 | Zimmerman et al. |
| 7,015,894 | B2 | 3/2006 | Morohoshi |
| 7,158,123 | B2 | 1/2007 | Myers et al. |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 9,250,783 | B2 | 2/2016 | Lehrian et al. |
| 2004/0150668 | A1 | 8/2004 | Myers et al. |
| 2006/0026521 | A1* | 2/2006 | Hotelling ............ G06F 3/0418 715/702 |
| 2006/0114529 | A1 | 6/2006 | Oh |
| 2006/0197753 | A1 | 9/2006 | Hotelling |
| 2008/0036743 | A1 | 2/2008 | Westerman et al. |
| 2008/0041640 | A1* | 2/2008 | Gillespie ............ G06F 3/03547 178/18.01 |
| 2009/0282370 | A1 | 11/2009 | Rainwater |
| 2011/0181528 | A1* | 7/2011 | Capela ............... G06F 3/04845 345/173 |
| 2011/0260962 | A1 | 10/2011 | Benko et al. |
| 2012/0013529 | A1 | 1/2012 | McGibney et al. |
| 2012/0030568 | A1 | 2/2012 | Migos et al. |
| 2012/0030569 | A1 | 2/2012 | Migos et al. |
| 2012/0216143 | A1 | 8/2012 | Shiplacoff et al. |
| 2013/0147761 | A1* | 6/2013 | Westerman ........... G06F 3/0235 345/174 |
| 2013/0271390 | A1 | 10/2013 | Lyons et al. |
| 2014/0028554 | A1 | 1/2014 | De Los Reyes et al. |
| 2014/0059485 | A1 | 2/2014 | Lehrian |

OTHER PUBLICATIONS

Kristensson, P.O. et al. (2007). "Command Strokes with and Without Preview: Using Pen Gestures on Keyboard for Command Selection," CHI Proceedings, Apr. 28-May 3, 2007, ten pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Jul. 17, 2014, for U.S. Appl. No. 13/591,006, filed Aug. 21, 2012, 12 pages.

Notice of Allowance dated Sep. 25, 2015 for U.S. Appl. No. 13/591,006, filed Aug. 21, 2012, eight pages.

Rubine, D.H. (Dec. 1991), "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

TOGGLE GESTURE DURING DRAG GESTURE

CROSS REFERENCE TO RELATED APPLICATION

This application is a continuation of U.S. patent application Ser. No. 13/591,006, filed Aug. 21, 2012 and published on Feb. 27, 2014 as U.S. Patent Publication No. 2014/0059485, the contents of which is incorporated herein by reference in its entirety for all purposes.

FIELD OF THE DISCLOSURE

This relates generally to drag and toggle gestures on a touch-sensitive device.

BACKGROUND OF THE DISCLOSURE

Many types of input devices are available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens generally allow a user to perform various functions by touching (e.g., physical contact or near-field proximity) the touch sensor panel using a finger, stylus or other object at a location often dictated by a user interface (UI) being displayed by the display device.

Example touch screen input can include a drag gesture, wherein a user touches a user interface object and "drags" across the surface of the touch screen. A drag gesture can cause some manipulation of the user interface object based on the distance, velocity, or acceleration of the drag. Possible manipulations can include moving the user interface object or resizing the user interface object, for example. However, the number of manipulations possible with a simple drag gesture may be limited.

SUMMARY OF THE DISCLOSURE

This relates to providing input to a computing device based on a toggle gesture performed during a drag gesture. A drag gesture can be performed on a touch screen to manipulate a user interface object. For example, the drag gesture can move the user interface object or resize the user interface object. Such manipulation commands may have alternate modes or options. For example, a user may want to place a copy of the user interface object rather than simply moving it. Accordingly, a toggle gesture can be performed during the drag gesture to choose an alternate manipulation command. For example, a drag gesture can be performed to move an object, and a toggle gesture can be performed during the drag gesture to copy the object instead of moving it. In another example, a drag gesture can resize several objects at once, each being resized proportionally to its initial size, and a toggle gesture can be performed during the drag gesture to instead make each object a uniform size and adjust that size with the drag gesture.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various examples relate to providing input to a computing device based on a toggle gesture performed during a drag gesture. A drag gesture can be performed on a touch screen to manipulate a user interface object. For example, the drag gesture can move the user interface object or resize the user interface object. Such manipulation commands may have alternate modes or options. For example, a user may want to place a copy of the user interface object rather than simply moving it. Accordingly, a toggle gesture can be performed during the drag gesture to choose an alternate manipulation command. For example, a drag gesture can be performed to move an object, and a toggle gesture can be performed during the drag gesture to copy the object instead of moving it. In another example, a drag gesture can resize several objects at once, each being resized proportionally to its initial size, and a toggle gesture can be performed during the drag gesture to instead make each object a uniform size and adjust that size with the drag gesture.

Although examples disclosed herein may be described and illustrated herein primarily in terms of a touch screen, it should be understood that the examples are not so limited, but are additionally applicable to touch I/O devices in general.

Figure 1A:
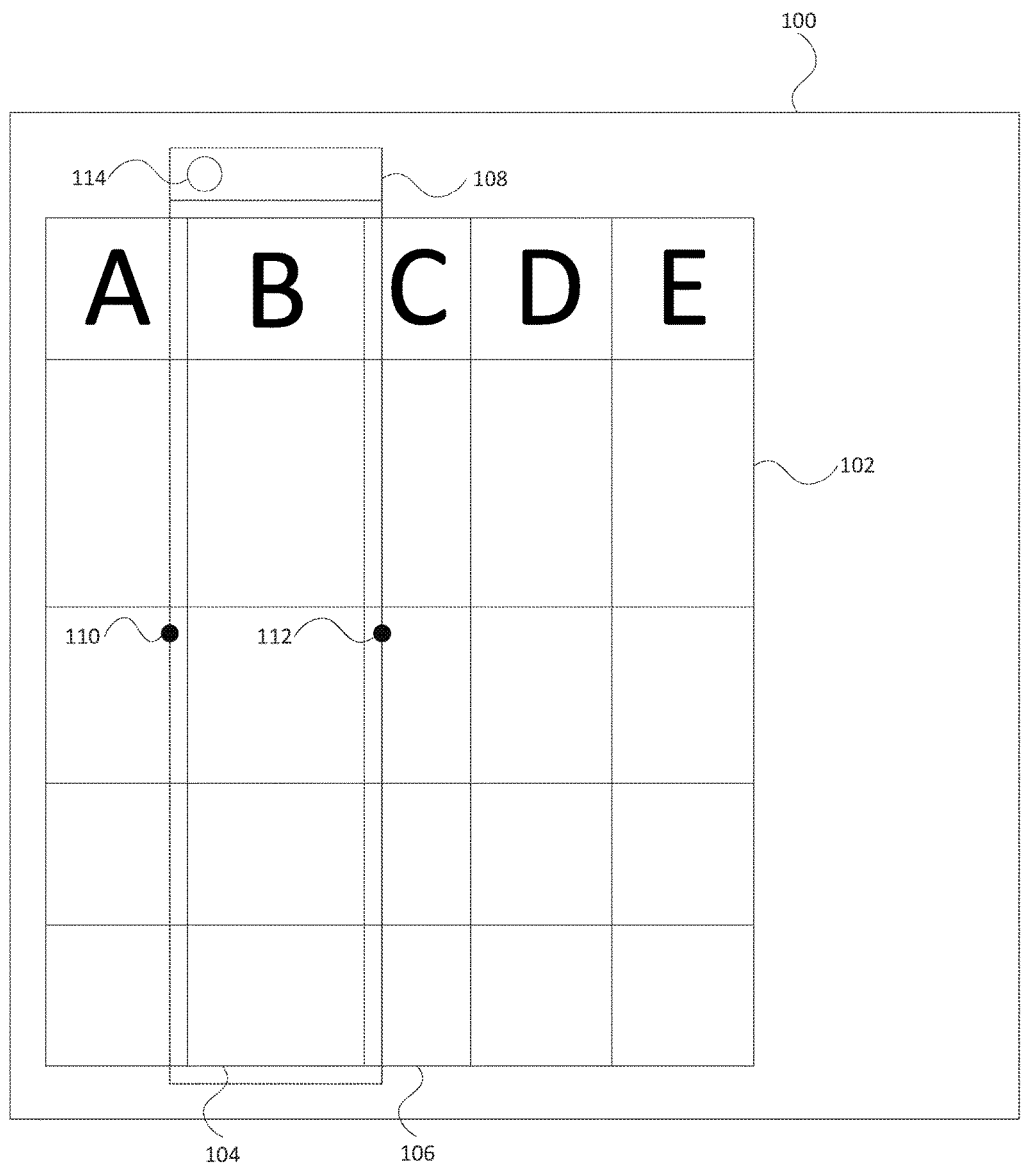
FIGS. 1A-C illustrate an exemplary toggle gesture according to examples of the disclosure.
Figure 1B:
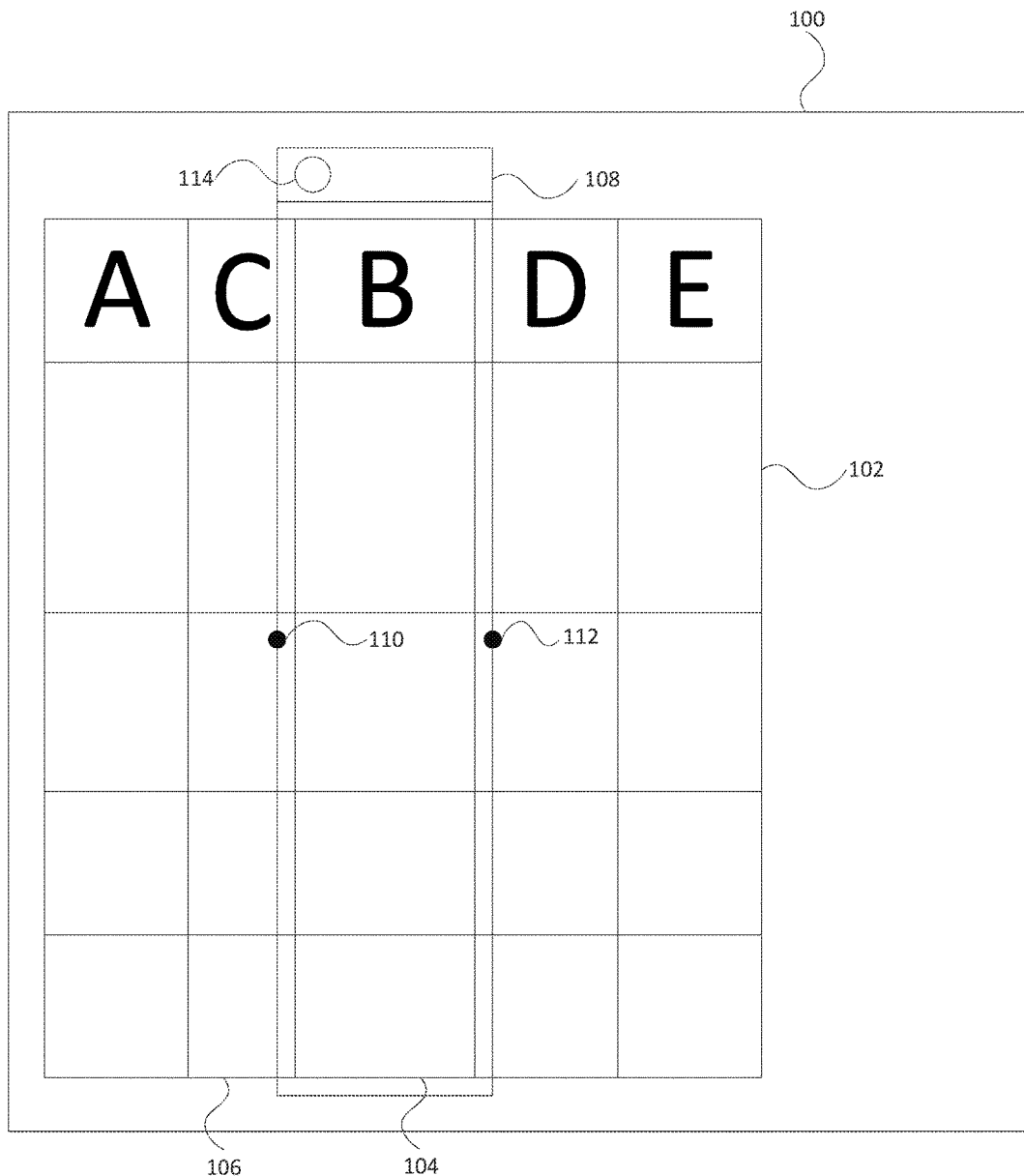
Figure 1C:
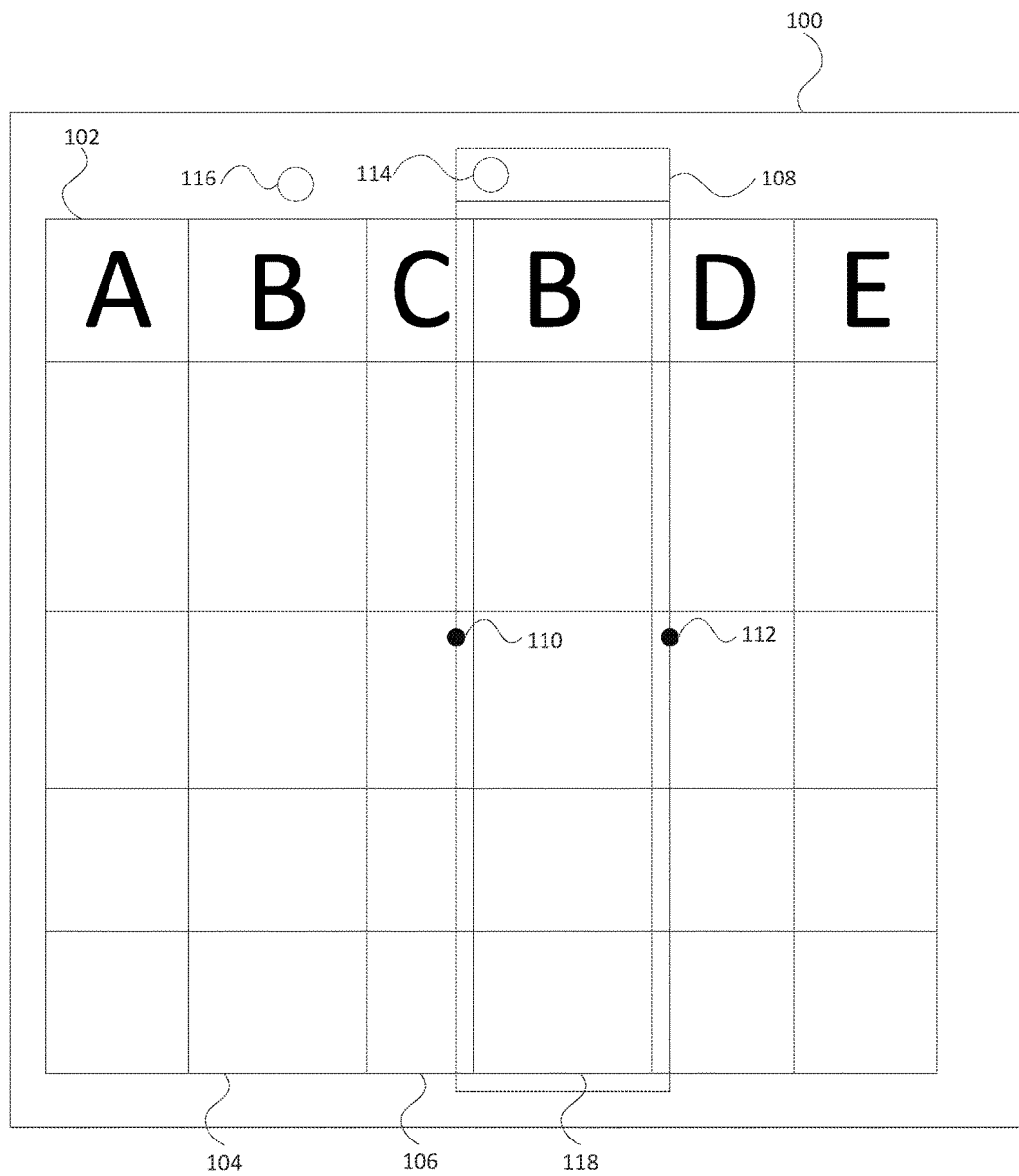

FIGS. 1A-C illustrate an exemplary toggle gesture according to examples of the disclosure. In one example, a toggle gesture can be used to modify the selection of a move command to instead select a copy command.

In FIG. 1A, a touch screen 100 can display a plurality of user interface (UI) objects, including table 102. The table 102 can be made up of several other UI objects displayed on the touch screen 100, including columns 104 and 106. Additionally, a selection indicator 108 can be displayed around column 104, indicating that column 104 is currently selected. The selection indicator 108 can have handles 110 and 112 for resizing selected columns. A position of a first touch input 114 can be represented as a circle in FIG. 1A, although touch input may not be explicitly displayed on a touch screen according to some examples. Although only the position of the touch input is shown in FIG. 1A, touch input can include position, velocity, acceleration, size, direction of motion, proximity, pressure, shape, orientation, tilt and other such features.

The first touch input 114 can be detected on the selection indicator 108, and a first command can be selected based on the detected first touch input 114. For example, a move command can be selected based on a detected drag gesture on selection indicator 108. A drag gesture can be detected when touch input is detected on a UI object and the touch input includes motion due to a user "dragging" across the surface of the touch screen. A command selected based on a gesture can take as parameters the features of the gesture. For example, a move command can take as a parameter the UI object on which the drag gesture is performed, or an object associated with that UI object. Additionally, a move command can take as a parameter the distance of the drag gesture, the velocity of the drag gesture, or the position of the touch input, among other possibilities. In some examples, touch input can include a simple tap input, a press-and-hold input, a swipe gesture, a pinch gesture, and/or a rotate gesture, among other possibilities. Additionally, in some examples, commands can include move, copy, resize, rotate, sort, and/or insert, among other possibilities.

FIG. 1B illustrates continued first touch input 114 on selection indicator 108. In some examples, the touch screen 100 can display a preview of execution of a selected command during the drag gesture. However, in some examples the selected command may not be actually executed until liftoff of the first touch input is detected.

For example, FIG. 1B illustrates a preview of execution of a move command. The position of the first touch input 114 can change, and the selected move command can take as a parameter the changed position. Additionally, the move command can take as a parameter the selection indicator 108 and/or its associated column 104. The preview of the executed move command can be displayed with column 104 moved to the right of column 106. However, if that move command has not actually been executed, additional motion of the first touch input 114 can cause the parameters of the selected move command to change, and the preview of the executed move command can change. Once liftoff of the first touch input 114 is detected and the drag gesture has concluded, the selected move command can be executed according to the parameters based on the drag gesture.

FIG. 1C illustrates a toggle gesture of second touch input 116 on the touch screen 100. A toggle gesture can be defined based on any touch input, including a simple touch down or touch down and motion, among other possibilities. In some examples, a toggle gesture may only be detected during some other touch input, such as during the detection of a drag gesture. Although FIG. 1C illustrates the second touch input 116 at an arbitrary position on the touch screen 100, in some examples a toggle gesture may only be recognized if the touch input is at a predefined location on the touch screen or within a predetermined threshold distance of the first touch input or some UI object.

The second touch input 116 can be detected, and the selection of the first command can be modified based on the detected second touch input 114. Modifying the selection of the first command can include selecting a second command instead of the first command. For example, the selection of a move command may be modified based on a detected toggle gesture. Modifying the selection of the move command can include selecting a copy command instead of a move command. FIG. 1C illustrates selecting a copy command based on the second touch input 116. A preview of the execution of the copy command can display a new column 118 that is a copy of previously selected column 104. The new column 118 can be inserted to the right of column 106 based on the position of first touch input 114. The selected second command can then be executed based on the detection of the liftoff of the first touch input 114.

In some examples, modifying the selection of the first command can include changing a parameter of the selected first command from a first value to a second value. For example, if the first command is a copy command, a paste-type may be a parameter of the copy command. Various paste-types may include plain text, formatted text, and the like. The selection of the copy command may include selecting plain text as a default paste-type. Modifying the selection of the copy command based on a toggle gesture can include changing the paste-type parameter from plain text to formatted text. The selected first command with the changed parameter can then be executed based on the detection of the liftoff of the first touch input 114.

In some examples, liftoff of the second touch input 116 can be detected, and the modification of the selection of the first command can be undone based on the detection of the liftoff of the second touch input. This can allow a user to undo the modification by ending the toggle gesture before any commands are executed. In cases where commands are only executed when the liftoff of the first touch input 114 is detected, the modification of the command can be undone by ending the toggle gesture before the liftoff of the first touch input.

If modification of the selection of the first command includes selecting a second command instead of the first command, then undoing the modification of the selection of the first command can include selecting the first command instead of the second command. For example, modifying the selection of a move command can include selecting a copy command instead of the move command, and undoing that modification can include selecting the move command instead of the copy command. If modification of the selection of the first command includes changing a parameter of the selected first command from a first value to a second value, then undoing the modification of the first command can include changing the parameter of the selected first command from the second value to the first value.

Although the general behavior of a toggle gesture may be that liftoff of the second touch input before liftoff of the first touch input will undo the modification, a user intending to perform a toggle gesture may attempt to liftoff both first and second touch inputs simultaneously and inadvertently liftoff the second before the first. Accordingly, in some examples, if liftoff of the first touch input is detected within a predetermined threshold time after the liftoff of the second touch input, then the modification of the selection of the first command may not be undone, and a command can be executed based on the modified selection of the first command, as if the liftoff of the first touch input had indeed occurred before the liftoff of the second touch input.

Figure 2A:
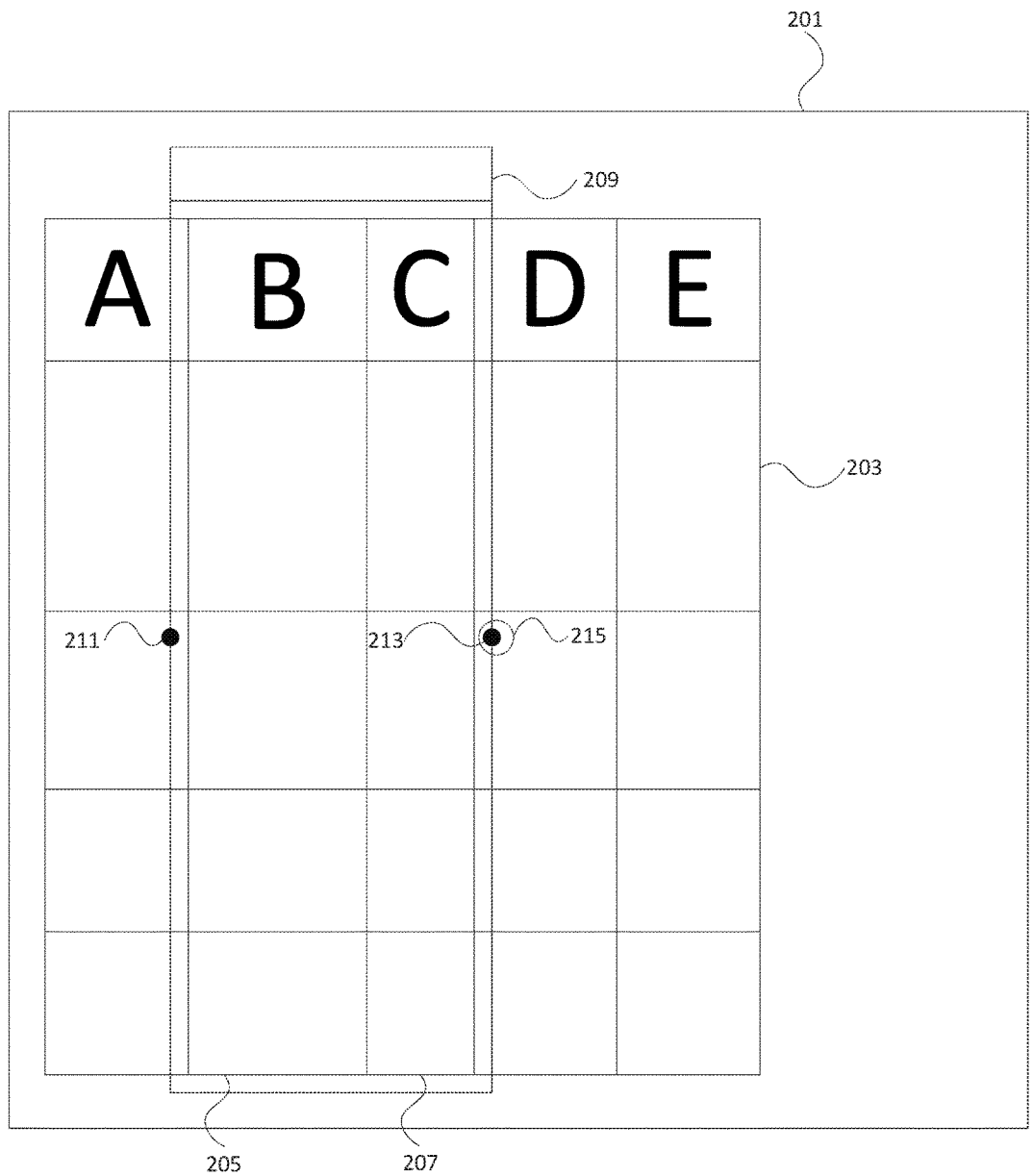
FIGS. 2A-C illustrate an exemplary toggle gesture according to examples of the disclosure.
Figure 2B:
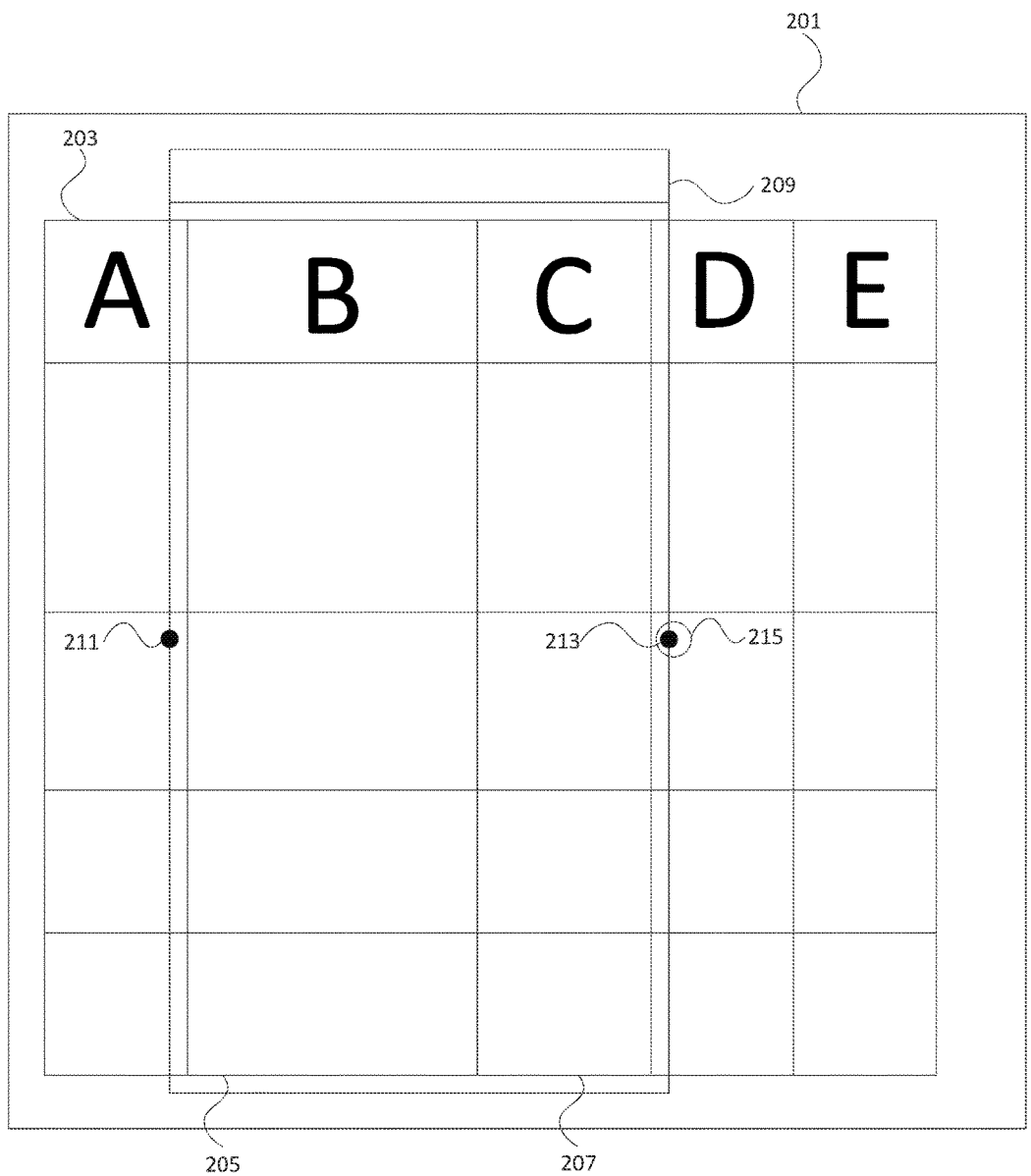
Figure 2C:
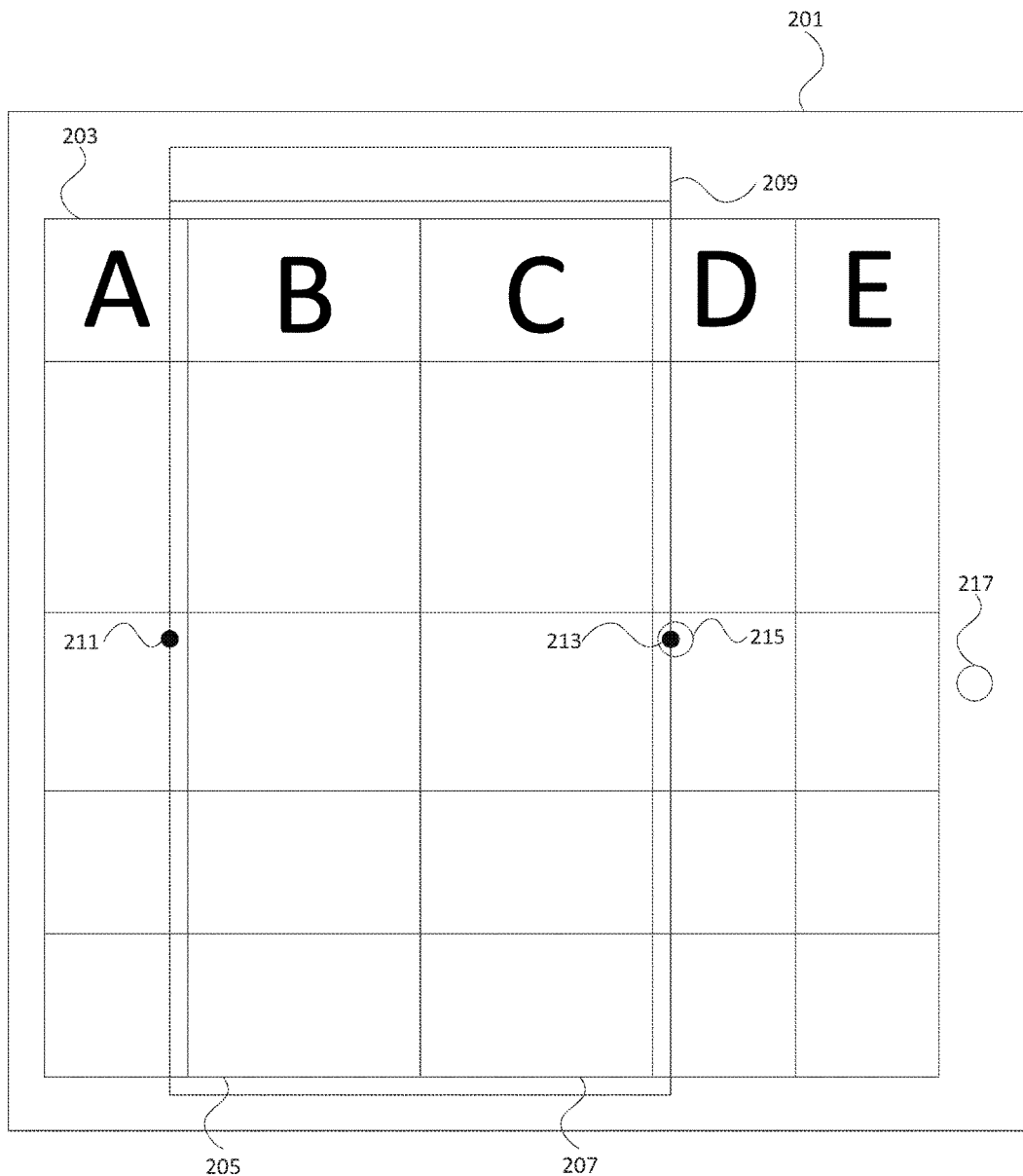

FIGS. 2A-C illustrate an exemplary toggle gesture according to examples of the disclosure. In one example, a toggle gesture can be used to modify the selection of a resize command including changing a resize-type parameter of the resize command from proportional to uniform.

In FIG. 2A, a touch screen 201 can display a plurality of UI objects, including table 203. The table 203 can be made up of several other UI objects displayed on the touch screen 201, including columns 205 and 207. Additionally, a selection indicator 209 can be displayed around columns 205 and 207, indicating that both columns 205 and 207 are currently selected. The selection indicator 209 can have handles 211 and 213 for resizing selected columns. A position of first touch input 215 can be represented as a circle in FIG. 2A, although touch input may not be explicitly displayed on a touch screen according to some examples. Although only the position of the touch input is shown in FIG. 2A, touch input can include position, velocity, acceleration, size, direction of motion, proximity, pressure, shape, orientation, tilt and other such features.

The first touch input 215 can be detected on the handle 213, and a first command can be selected based on the detected first touch input 215. For example, a resize command can be selected based on a detected drag gesture on handle 213.

FIG. 2B illustrates continued first touch input 215 on handle 213. A preview of execution of a resize command can be displayed on touch screen 201. The position of the first touch input 215 can change, and the selected resize command can take as a parameter the changed position. Additionally, the resize command can take as a parameter the handle 213, the associated selection indicator 209, and/or the associated columns 205 and 207. The resize command may also have a resize-type parameter set to proportional as a default. The preview of the executed resize command can be displayed with each of columns 205 and 207 resized proportionally to its original size. Once liftoff of the first touch input 215 is detected and the drag gesture has concluded, the selected resize command can be executed according to the parameters.

FIG. 2C illustrates a toggle gesture of second touch input 217 on the touch screen 201. Although FIG. 2C illustrates the second touch input 217 at an arbitrary position on the touch screen 201, in some examples a toggle gesture may only be recognized if the touch input is at a predefined location on the touch screen or within a predetermined threshold distance of the first touch input or some UI object.

The second touch input 217 can be detected, and the selection of the first command can be modified based on the detected second touch input 217. For example, the selection of a resize command may be modified based on a detected toggle gesture. Modifying the selection of the resize command can include changing the resize-type parameter of the resize command from proportional to uniform. FIG. 2C illustrates changing the resize-type parameter to uniform. A preview of the execution of the resize command with a uniform resize-type can display the columns 205 and 207 with uniform width. Once liftoff of the first touch input 215 is detected and the drag gesture has concluded, the selected resize command can be executed with a uniform resize-type.

In some examples, liftoff of the second touch input 217 can be detected, and the modification of the selection of the first command can be undone based on the detection of the liftoff of the second touch input. For example, undoing the modification of the selection of the resize command can include changing the resize-type parameter back from uniform to proportional.

In some examples, multiple toggle gestures can be performed to modify the selection of a first command in multiple ways. For example, detecting both a second touch input and a third touch input during the continued detection of a first touch input can cause the selection of the first command to be modified differently than if only the second touch input alone were detected during the continued detection of the first touch input. If the detection of a first touch input can cause the selection of a move command, then the detection of a second touch input can cause the selection of a copy command, and the detection of a second touch input and a third touch input can cause a paste-type parameter of the copy command to change from plain text to formatted text. Multiple such command and modification combinations are possible.

In some examples, the touch screen can display visual feedback to indicate that a toggle gesture has been performed. For example, if detection of a first touch input can cause the selection of a move command, and the detection of a second touch input can modify the selection of the move command so that a copy command is selected instead of the move command, then the touch screen can display a UI object indicative of the selection of a copy command during the detection of the second touch input. If liftoff of the second touch input is detected, then the modification of the selection of the move command can be undone so that the move command is selected instead of the copy command, and the touch screen can stop displaying the UI object indicative of the selection of the copy command. In some cases, the detection of the first touch input can cause the touch screen to display a UI object indicative of the selection of a first command, and the detection of a second touch input can cause the modification of the UI object so that it is indicative of a modification of the selection of the first command.

Figure 3:
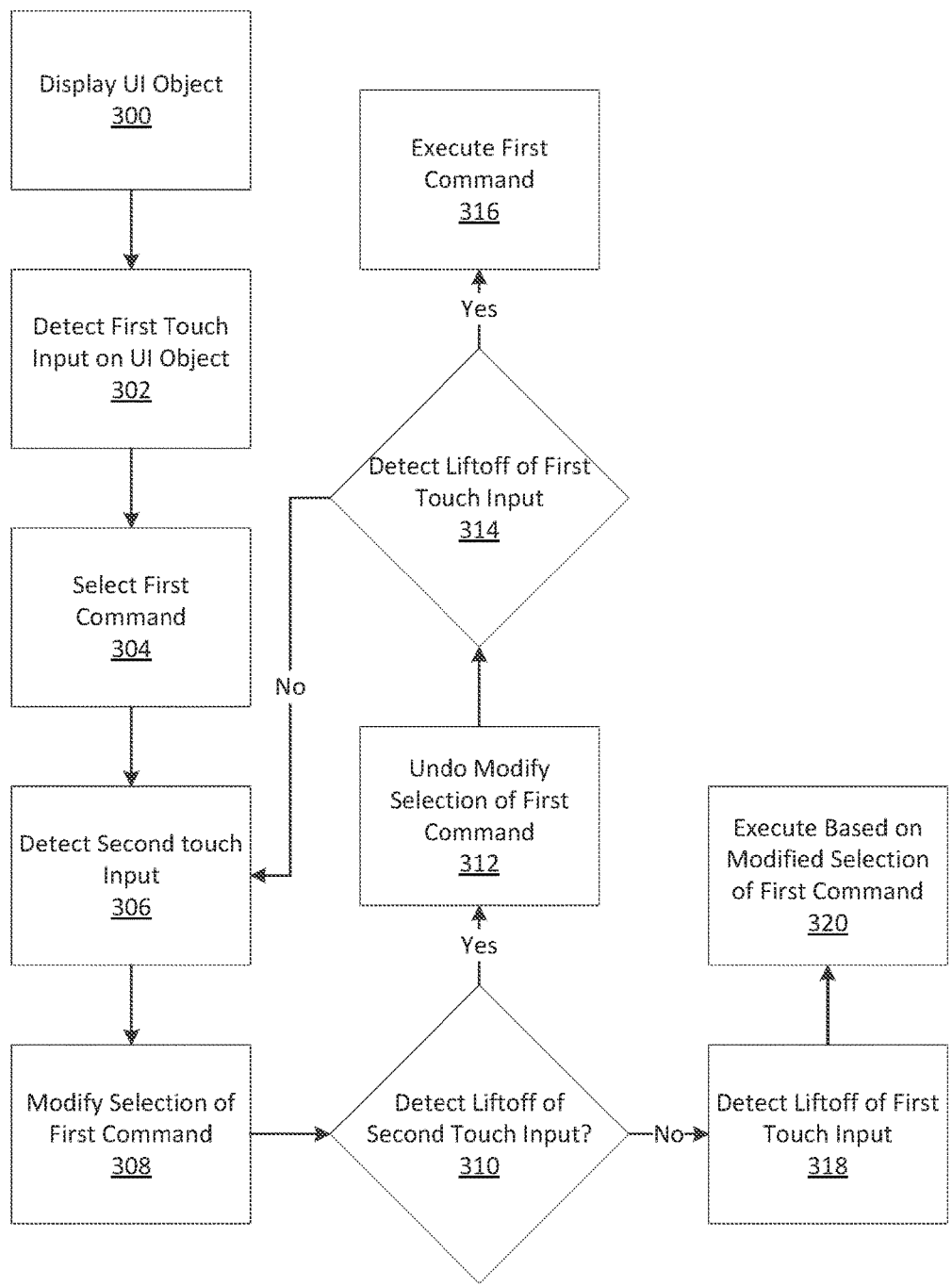
FIG. 3 illustrates an exemplary toggle gesture method according to examples of the disclosure.

FIG. 3 illustrates an exemplary toggle gesture method according to examples of the disclosure. First, a UI object can be displayed on a touch screen (step 300). A first touch input by a user can be detected on the UI object (step 302). Based on the first touch input, a first command can be selected (step 304). While continuing to detect the first touch input, a second touch input by a user can be detected on the touch screen (step 306). Based on the second touch input, the selection of the first command can be modified (step 308).

If liftoff of the second touch input is detected (step 310), then the modification of the selection of the first command can be undone based on the liftoff of the second touch input (step 312). If liftoff of the first touch input is subsequently detected (step 314), the first command can be executed (step 316). If liftoff of the first touch input is not detected before an additional second touch input is detected (step 306), the process can start over at step 308.

However, if liftoff of the second touch input is not detected (step 310), then the modification of the selection of the first command may not be undone. Based on detection of liftoff of the first touch input (step 318), a command can be executed based on the modified selection of the first command (step 320). For example, if modifying the selection of the first command includes selecting a second command instead of the first command, then executing a command based on the modified selection of the first command can include executing the second command. If modifying the selection of the first command includes maintaining the selection of the first command and changing a parameter of the first command from a first value to a second value, then executing a command based on the modified selection of the first command can include executing the first command with the second value as a parameter.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 4:
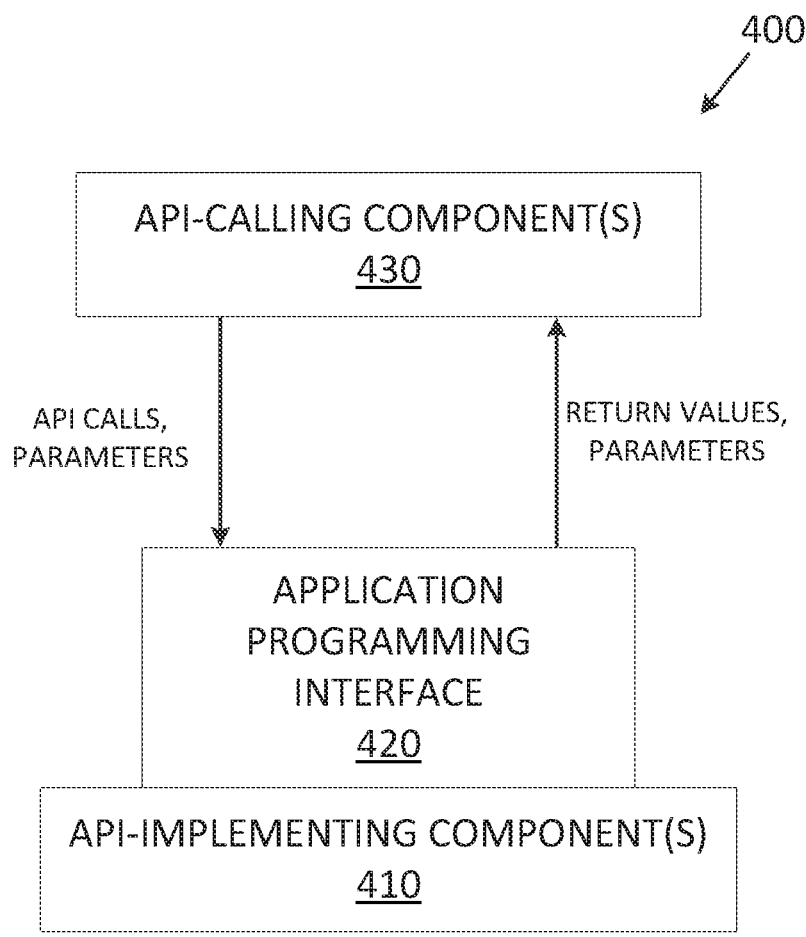
FIG. 4 is a block diagram illustrating an exemplary API architecture, which may be used in some examples of the disclosure.

FIG. 4 is a block diagram illustrating an exemplary API architecture, which may be used in some examples of the disclosure. As shown in FIG. 4, the API architecture 400 includes the API-implementing component 410 (e.g., an operating system, a library, a device driver, an API, an application program, software or other module) that implements the API 420. The API 420 specifies one or more functions, methods, classes, objects, protocols, data structures, formats and/or other features of the API-implementing component that may be used by the API-calling component 430. The API 420 can specify at least one calling convention that specifies how a function in the API-implementing component receives parameters from the API-calling component and how the function returns a result to the API-calling component. The API-calling component 430 (e.g., an operating system, a library, a device driver, an API, an application program, software or other module), makes API calls through the API 420 to access and use the features of the API-implementing component 410 that are specified by the API 420. The API-implementing component 410 may return a value through the API 420 to the API-calling component 430 in response to an API call.

It will be appreciated that the API-implementing component 410 may include additional functions, methods, classes, data structures, and/or other features that are not specified through the API 420 and are not available to the API-calling component 430. It should be understood that the API-calling component 430 may be on the same system as the API-implementing component 410 or may be located remotely and accesses the API-implementing component 410 using the API 420 over a network. While FIG. 4 illustrates a single API-calling component 430 interacting with the API 420, it should be understood that other API-calling components, which may be written in different languages (or the same language) than the API-calling component 430, may use the API 420.

The API-implementing component 410, the API 420, and the API-calling component 430 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 5:
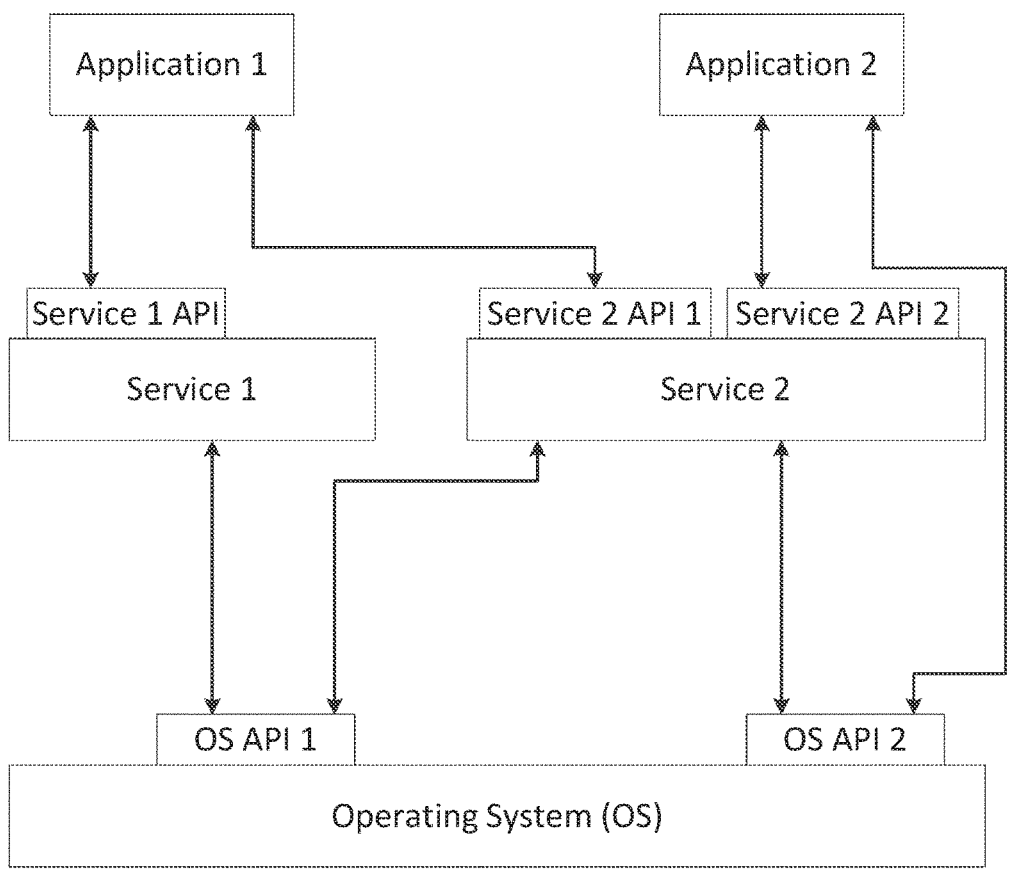
FIG. 5 illustrates an exemplary software stack of an API according to examples of the disclosure.

In the exemplary software stack shown in FIG. 5, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 6:
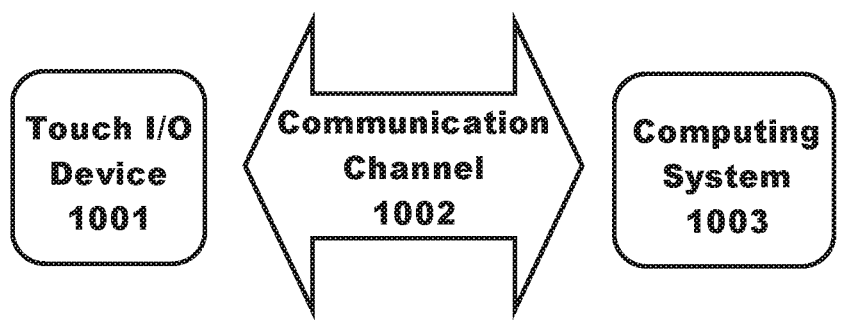
FIG. 6 is a block diagram illustrating exemplary interactions between the touch screen and the other components of the device according to examples of the disclosure.

FIG. 6 is a block diagram illustrating exemplary interactions between the touch screen and the other components of the device. In FIG. 6, the touch screen illustrated in FIGS. 1A-C and 2A-C and can be the touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensitive components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof. Exemplary gestures include the drag and toggle gestures discussed above in view of FIGS. 1A-C and 2A-C.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactorally, acoustically, or the like or any combination thereof and in a variable or non-variable manner.

Figure 7:
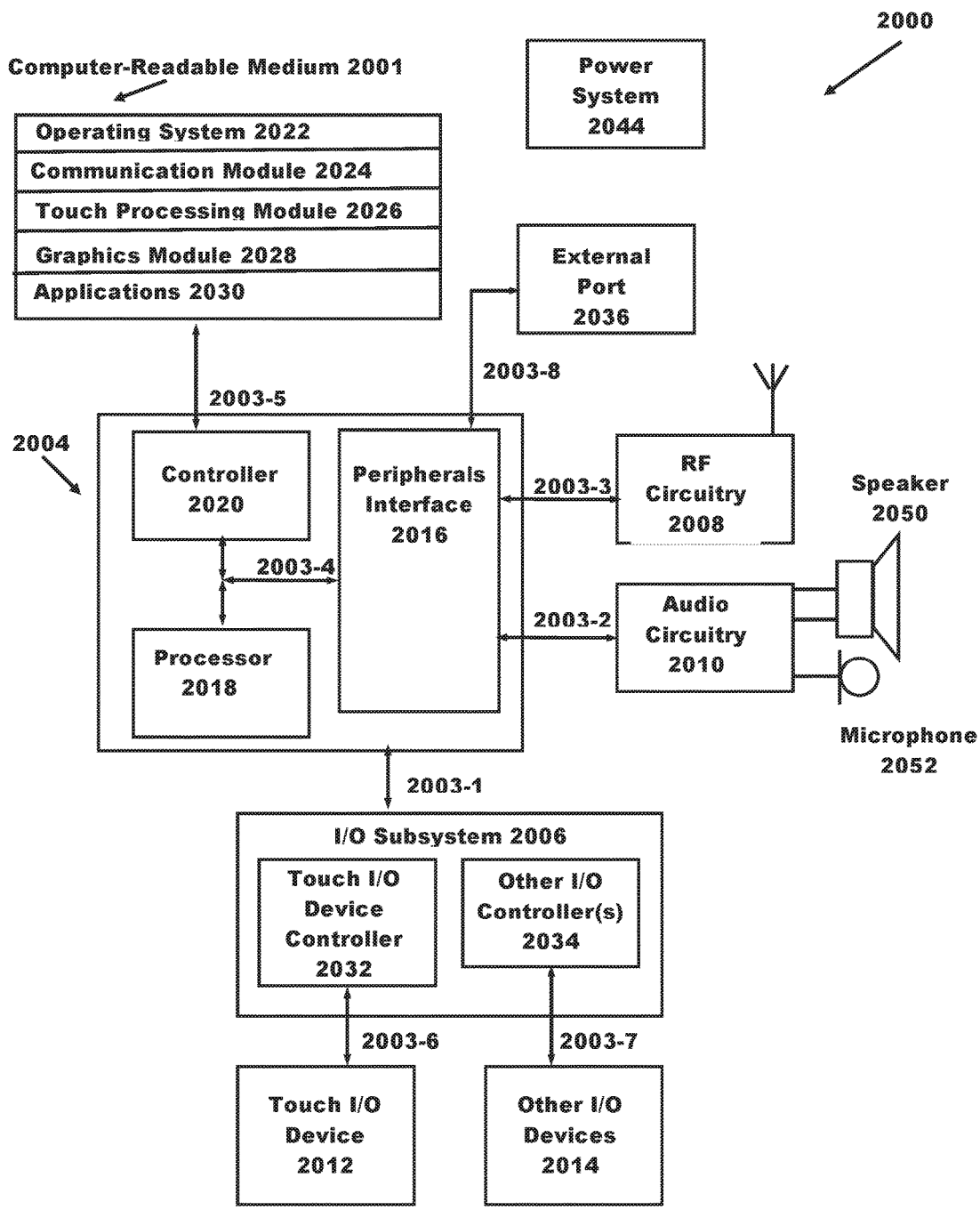
FIG. 7 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 7 is a block diagram of one example of system 2000 that generally includes one or more computer-readable mediums 2001, processing system 2004, I/O subsystem 2006, radio frequency (RF) circuitry 2008 and audio circuitry 2010. These components may be coupled by one or more communication buses or signal lines 2003.

It should be apparent that the architecture shown in FIG. 7 is only one example architecture of system 2000, and that system 2000 could have more or fewer components than shown, or a different configuration of components. The various components shown in FIG. 7 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, and one or more applications (or set of instructions) 2030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

In some examples, a computer-implemented method is disclosed. The method includes detecting a first touch input by a user on a touch-sensitive surface; selecting a first command based on the first touch input; while continuing to detect the first touch input, detecting a second touch input by the user on the touch-sensitive surface; and modifying the selection of the first command based on the second touch input. Additionally or alternatively to one or more of the examples disclosed above, the method can further include: detecting a liftoff of the second touch input; undoing the modifying the selection of the first command based on the liftoff of the second touch input; detecting a liftoff of the first touch input; and executing the first command based on the liftoff of the first touch input. Additionally or alternatively to one or more of the examples disclosed above, modifying the selection of the first command can include selecting a second command, and the method can further include: detecting a liftoff of the first touch input; and executing the second command based on the liftoff of the first touch input. Additionally or alternatively to one or more of the examples disclosed above, the method can further include: while continuing to detect the first touch input, detecting a third touch input by the user on the touch-sensitive surface; and modifying the selection of the first command based on the third touch input. Additionally or alternatively to one or more of the examples disclosed above, modifying the selection of the first command can include changing a parameter of the first command from a first value to a second value, and the method can further include: detecting a liftoff of the first touch input; and executing the first command with the second value as a parameter. Additionally or alternatively to one or more of the examples disclosed above, the method can further include: determining a distance between the second touch input and the first touch input; and determining that the distance is less than a predetermined threshold distance; wherein modifying the selection of the first command can be further based on the determining that the distance is less than the predetermined threshold distance. Additionally or alternatively to one or more of the examples disclosed above, the method can further include: determining that the second touch input is within a predefined location on the touch-sensitive surface; wherein modifying the selection of the first command can be further based on the determining that the second touch input is within the predefined location on the touch-sensitive surface. Additionally or alternatively to one or more of the examples disclosed above, the method can further include: detecting a liftoff of the first touch input at a first liftoff time; detecting a liftoff of the second touch input at a second liftoff time; determining that the first liftoff time is within a predetermined temporal threshold after the second liftoff time; and in response to the determining that the first liftoff time is within the predetermined temporal threshold after the second liftoff time, executing a command based on the modifying the selection of the first command. Additionally or alternatively to one or more of the examples disclosed above, the first command can include one of move, copy, resize, rotate, sort, and insert.

In some examples, an electronic device is provided. The electronic device can include a touch-sensitive surface for receiving touch input; a processor to execute instructions; and a memory coupled with the processor to store instructions, which when executed by the processor, cause the processor to perform operations to generate an application programming interface (API) that allows an API-calling component to perform the following operations: detecting a first touch input by a user on the touch-sensitive surface; selecting a first command based on the first touch input; while continuing to detect the first touch input, detecting a second touch input by the user on the touch-sensitive surface; and modifying the selection of the first command based on the second touch input. Additionally or alternatively to one or more of the examples disclosed above, the operations can further include: detecting a liftoff of the second touch input; undoing the modifying the selection of the first command based on the liftoff of the second touch input; detecting a liftoff of the first touch input; and executing the first command based on the liftoff of the first touch input. Additionally or alternatively to one or more of the examples disclosed above, modifying the selection of the first command can include selecting a second command, and the operations can further include: detecting a liftoff of the first touch input; and executing the second command based on the liftoff of the first touch input. Additionally or alternatively to one or more of the examples disclosed above, the operations can further include: while continuing to detect the first touch input, detecting a third touch input by the user on the touch-sensitive surface; and modifying the selection of the first command based on the third touch input. Additionally or alternatively to one or more of the examples disclosed above, modifying the selection of the first command can include changing a parameter of the first command from a first value to a second value, and the operations can further include: detecting a liftoff of the first touch input; and executing the first command with the second value as a parameter. Additionally or alternatively to one or more of the examples disclosed above, the operations can further include: determining a distance between the second touch input and the first touch input; and determining that the distance is less than a predetermined threshold distance; wherein modifying the selection of the first command can be further based on the determining that the distance is less than the predetermined threshold distance. Additionally or alternatively to one or more of the examples disclosed above, the operations can further include: determining that the second touch input is within a predefined location on the touch-sensitive surface; wherein modifying the selection of the first command can be further based on the determining that the second touch input is within the predefined location on the touch-sensitive surface.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A computer-implemented method, comprising:
at a computing device including a touch-sensitive surface:
detecting a first touch input by a first contact on the touch-sensitive surface;
in response to detecting the first touch input, selecting a first command based on the first touch input;
after detecting the first touch input by the first contact, detecting a second touch input by a second contact, different from the first contact, on the touch-sensitive surface;
in response to detecting the second touch input, modifying the selection of the first command based on the second touch input;
detecting liftoff of a contact from the touch-sensitive surface; and
in response to detecting liftoff of a contact from the touch-sensitive surface:
in accordance with detecting liftoff of the first contact, executing the selected first command as modified based on the second touch input;
in accordance with detecting liftoff of the second contact, undoing the modifying the selection of the first command.

2. The method of claim 1, further comprising:
detecting a liftoff of the first contact after undoing the modifying the selection of the first command; and
in response to detecting liftoff of the first contact after undoing, executing the first command based on the liftoff of the first contact.

3. The method of claim 1, wherein modifying the selection of the first command includes selecting a second command, and executing the selected first command as modified based on the second touch input includes executing the second command.

4. The method of claim 3, further comprising:
while continuing to detect the first touch input, detecting a third touch input by a third contact on the touch-sensitive surface; and
modifying the selection of the first command based on the third touch input.

5. The method of claim 1, wherein modifying the selection of the first command includes changing a parameter of the first command from a first value to a second value, and executing the selected first command as modified based on the second touch input includes executing the first command with the second value as a parameter.

6. The method of claim 1, further comprising:
determining a distance between the second touch input and the first touch input; and
determining that the distance is less than a predetermined threshold distance;
wherein modifying the selection of the first command is further based on the determining that the distance is less than the predetermined threshold distance.

7. The method of claim 1, further comprising:
determining that the second touch input is within a predefined location on the touch-sensitive surface;
wherein modifying the selection of the first command is further based on the determining that the second touch input is within the predefined location on the touch-sensitive surface.

8. The method of claim 1, further comprising:
detecting a liftoff of the first contact at a first liftoff time;
detecting a liftoff of the second contact at a second liftoff time;
determining that the first liftoff time is within a predetermined temporal threshold after the second liftoff time; and
in response to the determining that the first liftoff time is within the predetermined temporal threshold after the second liftoff time, executing a command based on the modifying the selection of the first command.

9. The method of claim 1, wherein the first command includes one of move, copy, resize, rotate, sort, and insert.

10. A non-transitory computer readable storage medium having stored therein instructions, which when executed by a device having a touch-sensitive surface, cause the device to perform a method comprising:
detecting a first touch input by a first contact on the touch-sensitive surface;

in response to detecting the first touch input, selecting a first command based on the first touch input;

after detecting the first touch input by the first contact, detecting a second touch input by a second contact, different from the first contact, on the touch-sensitive surface;

in response to detecting the second touch input, modifying the selection of the first command based on the second touch input;

detecting liftoff of a contact from the touch-sensitive surface; and in response to detecting liftoff of a contact from the touch-sensitive surface:
　in accordance with detecting liftoff of the first contact, executing the selected first command as modified based on the second touch input;
　in accordance with detecting liftoff of the second contact, undoing the modifying the selection of the first command.

11. The non-transitory computer readable storage medium of claim 10, further comprising:
　detecting a liftoff of the first contact after undoing the modifying the selection of the first command; and
　in response to detecting liftoff of the first contact after undoing, executing the first command based on the liftoff of the first contact.

12. The non-transitory computer readable storage medium of claim 10, wherein modifying the selection of the first command includes selecting a second command, and executing the selected first command as modified based on the second touch input includes executing the second command.

13. The non-transitory computer readable storage medium of claim 12, further comprising:
　while continuing to detect the first touch input, detecting a third touch input by a third contact on the touch-sensitive surface; and
　modifying the selection of the first command based on the third touch input.

14. The non-transitory computer readable storage medium of claim 10, wherein modifying the selection of the first command includes changing a parameter of the first command from a first value to a second value, and executing the selected first command as modified based on the second touch input includes executing the first command with the second value as a parameter.

15. The non-transitory computer readable storage medium of claim 10, further comprising:
　determining a distance between the second touch input and the first touch input; and
　determining that the distance is less than a predetermined threshold distance;
　wherein modifying the selection of the first command is further based on the determining that the distance is less than the predetermined threshold distance.

16. The non-transitory computer readable storage medium of claim 10, further comprising:
　determining that the second touch input is within a predefined location on the touch-sensitive surface;
　wherein modifying the selection of the first command is further based on the determining that the second touch input is within the predefined location on the touch-sensitive surface.

17. The non-transitory computer readable storage medium of claim 10, further comprising:
　detecting a liftoff of the first contact at a first liftoff time;
　detecting a liftoff of the second contact at a second liftoff time;
　determining that the first liftoff time is within a predetermined temporal threshold after the second liftoff time; and
　in response to the determining that the first liftoff time is within the predetermined temporal threshold after the second liftoff time, executing a command based on the modifying the selection of the first command.

18. The non-transitory computer readable storage medium of claim 10, wherein the first command includes one of move, copy, resize, rotate, sort, and insert.

19. An electronic device, comprising:
　a touch-sensitive surface for receiving touch input;
　a processor to execute instructions; and
　a memory coupled with the processor to store instructions, which when executed by the processor, cause the processor to perform a method comprising:
　　detecting a first touch input by a first contact on the touch-sensitive surface;
　　in response to detecting the first touch input, selecting a first command based on the first touch input;
　　after detecting the first touch input by the first contact, detecting a second touch input by a second contact, different from the first contact, on the touch-sensitive surface;
　　in response to detecting the second touch input, modifying the selection of the first command based on the second touch input;
　　detecting liftoff of a contact from the touch-sensitive surface; and
　　in response to detecting liftoff of a contact from the touch-sensitive surface:
　　　in accordance with detecting liftoff of the first contact, executing the selected first command as modified based on the second touch input;
　　　in accordance with detecting liftoff of the second contact, undoing the modifying the selection of the first command.

20. The electronic device of claim 19, the method further comprising:
　detecting a liftoff of the first contact after undoing the modifying the selection of the first command; and
　in response to detecting liftoff of the first contact after undoing, executing the first command based on the liftoff of the first contact.

* * * * *